April 10, 1951              V. L. TYSON              2,548,410
MOISTURE INDICATOR FOR SAND AND GRAVEL WEIGHING HOPPERS
Filed July 27, 1949                                    2 Sheets-Sheet 1
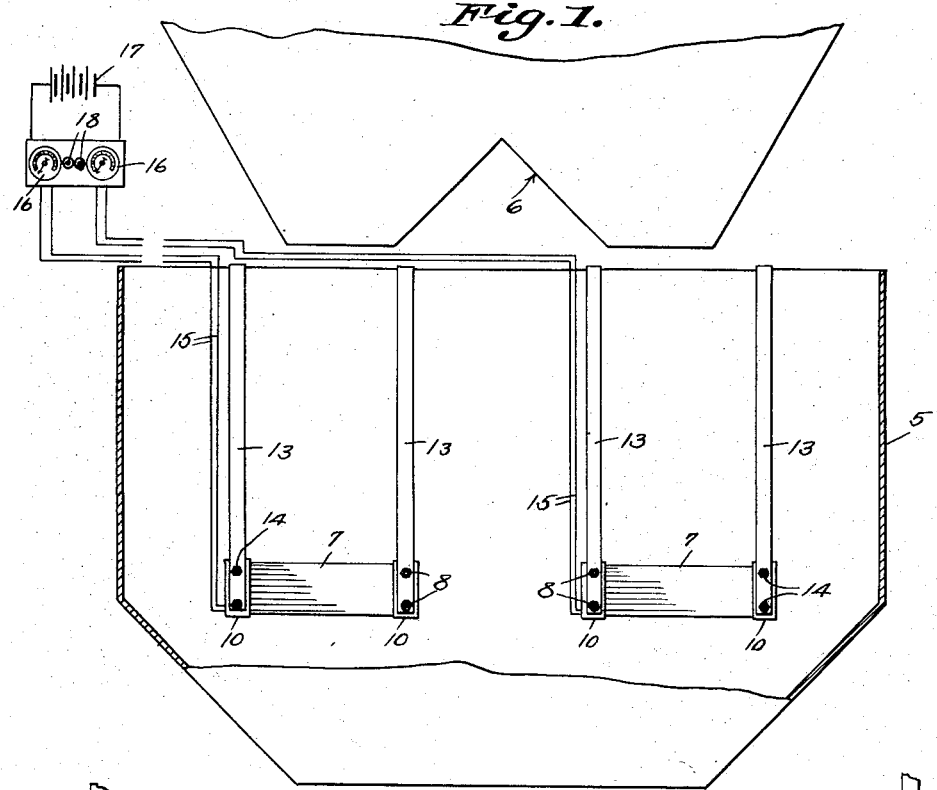
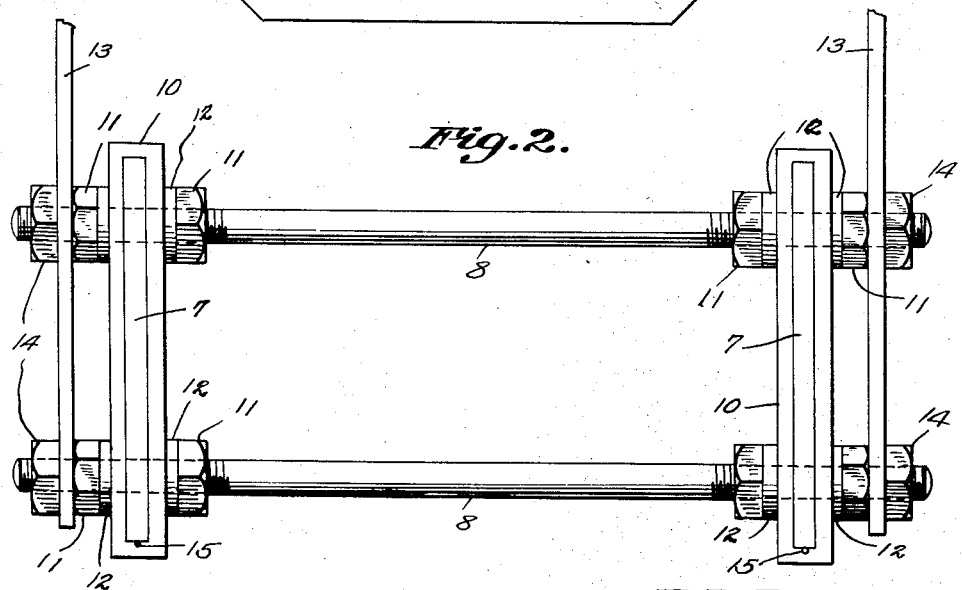
V. L. Tyson
INVENTOR
BY C. A. Snow & Co.
ATTORNEYS.

April 10, 1951 V. L. TYSON 2,548,410
MOISTURE INDICATOR FOR SAND AND GRAVEL WEIGHING HOPPERS
Filed July 27, 1949 2 Sheets-Sheet 2
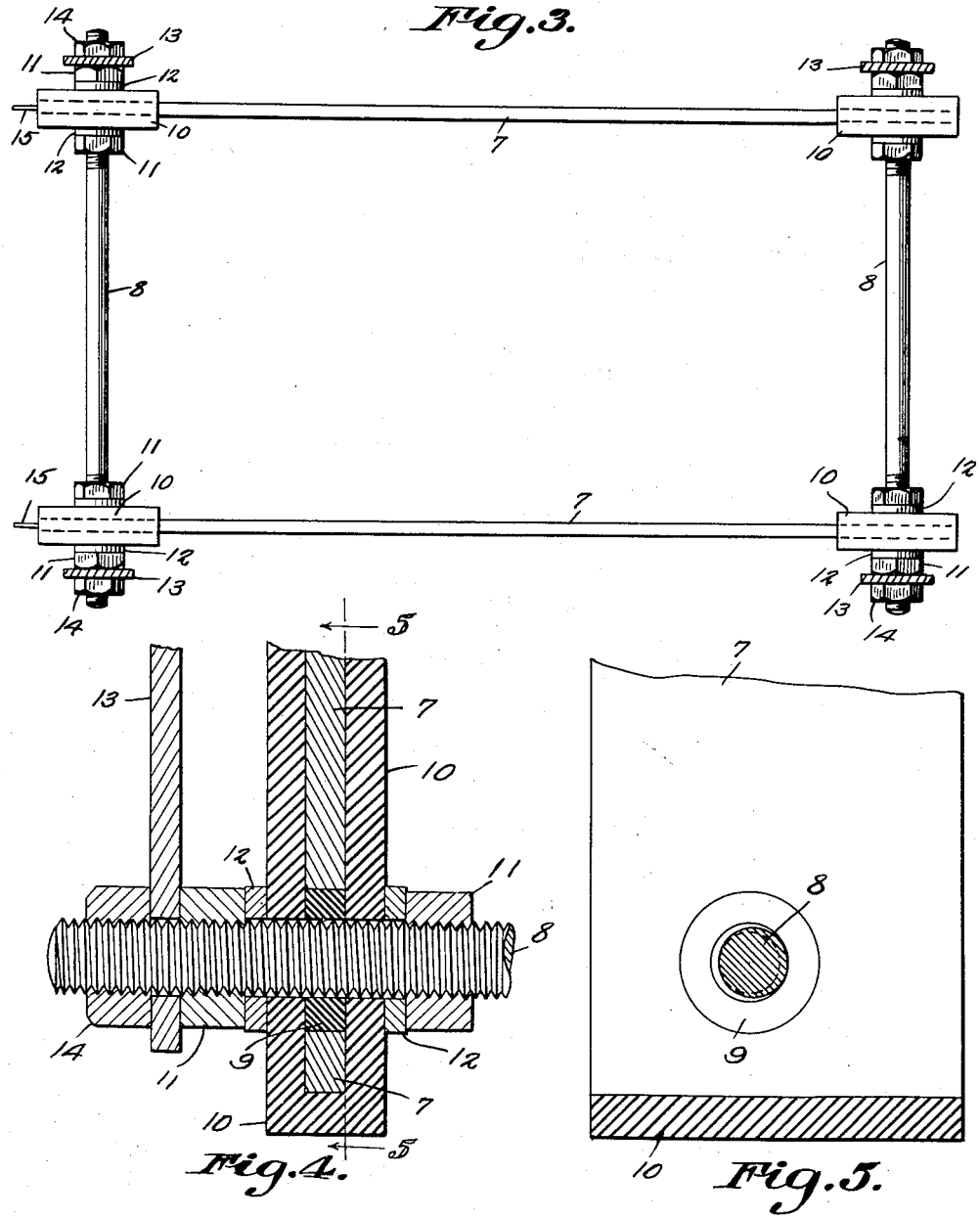
V. L. Tyson
INVENTOR
BY C. A. Snow & Co.
ATTORNEYS.

Patented Apr. 10, 1951

2,548,410

UNITED STATES PATENT OFFICE 2,548,410

MOISTURE INDICATOR FOR SAND AND GRAVEL WEIGHING HOPPERS

Vernon L. Tyson, Miami, Fla.

Application July 27, 1949, Serial No. 106,992

1 Claim. (Cl. 175—183)

This invention relates to a device designed for use in determining the water content of sand and gravel used in the manufacture of transported mixed concrete.

An important object of the invention is to provide means located in the weighing hopper into which the sand and gravel for a concrete mix, are deposited prior to the loading of the trucks in which the aggregate is mixed while being transported to the job, so that a sufficient quantity of water may be provided for a perfect mix.

Another object of the invention is to provide a moisture content indicating device of an electrical character which may be operated at intervals by the attendant to ascertain the moisture content of the sand and gravel which is to be delivered into the concrete mixing truck.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing:

Figure 1 is a sectional view through a weighing hopper for weighing sand and gravel, the moisture indicating device forming the subject matter of the present invention, being shown in elevation.

Fig. 2 is an end elevational view of the device.

Fig. 3 is a plan view thereof.

Fig. 4 is a fragmental sectional view through one corner of one of the conductor plates and its support.

Fig. 5 is a sectional view taken on line 5—5 of Fig. 4.

Referring to the drawings in detail, the reference character 5 indicates a weighing hopper of the conventional type used in connection with spouts of grain bins, such as indicated by the reference character 6, the spouts being arranged to discharge sand and gravel directly into the weighing hopper, from which the aggregates are deposited in a mixing truck used in mixing the concrete while the truck is in transport to the job.

The indicating device forming the essence of the present invention embodies a pair of conductor plates 7, which are connected and held in parallel spaced relation with respect to each other, by means of the connecting bolts 8, which are arranged in pairs at the ends of the conductor plates. These bolts 8 are shown as extended through openings in the conductor plates, and are insulated from the conductor plates by means of the rubber insulating washers 9 that are shown as fitted in openings of the conductor plates, between the bolts and conductor plates.

Rubber insulating pads 10 are fitted around the conductor plates at points adjacent to the ends thereof, and these rubber insulating pads 10 are also formed with openings that align with the openings of the washers 9 to accommodate the connecting bolts 8. Positioned on the bolts 8 and disposed at opposite sides of the insulating pads 10, are securing nuts 11 which force the washers 12, which are also positioned on the bolts 8, into close engagement with the insulating pads, securing the conductor plates to the bolts.

The reference character 13 indicates hanger arms which are formed with openings to accommodate the bolts 8, which are connected to the outer ends thereof, there being provided nuts 14 positioned on the threaded ends of the bolts 8 for engaging the hanger arms 13, and securing the hanger arms into close engagement with the outer nuts 11 of the bolts.

The upper ends of these hanger arms are secured to the sides of the weighing hopper 5, in such a way that they will not become displaced by the sand and gravel entering the weighing hopper.

The wires 15 provide electric circuits between the electric indicators 16 and source of electricity supply 17, the circuits being controlled by the switches 18 forming a part thereof.

It will, of course, be understood that the wires forming the electric circuit are connected to the conductor plates at opposite sides of the device so that the electric current will flow between the conductor plates, and the rate of flow will be governed by the amount of moisture in the sand or gravel, with the result that an indication will be registered by the electric indicators 16, and this reading made quickly by the operator merely pressing one of the switches to complete the circuit.

From the foregoing it will be seen that due to the construction shown and described, it will be an easy operation for the attendant to check the moisture content of the sand or gravel used in a concrete mix to insure the desired quality of the concrete.

Having thus described the invention what is claimed is:

The combination with a sand and gravel container, of a moisture indicating device comprising a pair of wide spaced parallel conductor plates having their side faces disposed vertically, bolts connecting the conductor plates, hanger insulating pads encasing the ends of the conductor plates, arms having openings through which the bolts extend securing the hanger arms and plates together, a hook formed in one of the respective ends of each hanger, said hooks adapted to be fitted over the upper edge of the container with which the device is used, removably supporting the conductor plates within the container, and electric wires leading from the ends of the conductor plates, the circuit between the wires and conductor plates being completed by the moisture laden material contacting with the conductor plates.

VERNON L. TYSON.

REFERENCES CITED

The following references are of record in the file of this patent:

UNITED STATES PATENTS

| Number | Name | Date |
| --- | --- | --- |
| 1,145,509 | Pike et al. | July 6, 1915 |
| 1,890,545 | Limbrick | Dec. 13, 1932 |
| 2,016,920 | Fisher et al. | Oct. 8, 1935 |
| 2,243,436 | Mumford | May 27, 1941 |
| 2,486,131 | Dustman | Oct. 25, 1949 |